(12) United States Patent
Williams et al.

(10) Patent No.: US 9,406,153 B2
(45) Date of Patent: Aug. 2, 2016

(54) POINT OF INTEREST (POI) DATA POSITIONING IN IMAGE

(75) Inventors: Samuel Williams, Redmond, WA (US);
Timothy Wantland, Bellevue, WA (US);
Gonzalo Ramos, Kirkland, WA (US);
Peter G. Sibley, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 496 days.

(21) Appl. No.: 13/325,652

(22) Filed: Dec. 14, 2011

(65) Prior Publication Data

US 2013/0155181 A1 Jun. 20, 2013

(51) Int. Cl.
| | |
|---|---|
| H04N 7/00 | (2011.01) |
| G06T 11/00 | (2006.01) |
| H04N 5/232 | (2006.01) |
| H04N 13/00 | (2006.01) |

(Continued)

(52) U.S. Cl.
CPC ............ *G06T 11/00* (2013.01); *G01C 21/3679* (2013.01); *G09B 29/106* (2013.01); *H04N 5/23238* (2013.01); *H04N 13/0055* (2013.01); *H04N 13/0282* (2013.01); *H04N 13/0445* (2013.01); *H04N 13/0456* (2013.01)

(58) Field of Classification Search
CPC .......... H04N 5/23238; H04N 13/0055; H04N 13/0282; H04N 13/0445; H04N 13/0456
USPC .................................. 348/39, 36, 37, 38, 42
See application file for complete search history.

(56) References Cited

U.S. PATENT DOCUMENTS

| 5,973,726 A | 10/1999 | Iijima et al. |
|---|---|---|
| 6,064,399 A | 5/2000 | Teo |

(Continued)

FOREIGN PATENT DOCUMENTS

| CN | 1567385 | 1/2005 |
|---|---|---|
| CN | 1641702 | 7/2005 |

(Continued)

OTHER PUBLICATIONS

Sibiryakov, Alexander, "Photo collection representation based on viewpoint clustering"—Published Date: Nov. 28, 2007, Proceedings: Electronic Imaging and Multimedia Technology, http://citeseerx.ist.psu.edu/viewdoc/download?doi=10.1.1.148.8701&rep=rep1&type=pdf.

(Continued)

*Primary Examiner* — Helen Shibru
(74) *Attorney, Agent, or Firm* — Steven Spellman; Tom Wong; Micky Minhas

(57) ABSTRACT

Among other things, one or more techniques and/or systems are disclosed for positioning point-of-interest (POI) data in a planar panorama image, generated from a plurality of relatively sequential images. First POI data with a first geo-location and second POI data with a second geo-location can be received for the planar panorama image, and first and second data tags can be created that respectively comprise at least some of the first and second POI data. A cluster geo-location may be identified for the first and second data tags based at least upon the first and second geo-locations, and the first and second data tags can be clustered at the cluster geo-location in the planar panorama image. The first and second data tags can be re-clustered (e.g., moved around) and displayed at different locations within the planar panorama image in response to a zoom operation, for example.

20 Claims, 10 Drawing Sheets

(51) Int. Cl.
*H04N 13/02* (2006.01)
*H04N 13/04* (2006.01)
*G09B 29/10* (2006.01)
*G01C 21/36* (2006.01)

(56) References Cited

U.S. PATENT DOCUMENTS

| | | | |
|---|---|---|---|
| 6,075,905 | A | 6/2000 | Herman et al. |
| 6,205,253 | B1 | 3/2001 | King |
| 6,665,003 | B1 | 12/2003 | Peleg et al. |
| 7,110,592 | B2 | 9/2006 | Kotake |
| 7,298,548 | B2 | 11/2007 | Mian |
| 7,499,586 | B2 | 3/2009 | Argawala |
| 7,558,432 | B2 | 7/2009 | Zaharia et al. |
| 7,580,076 | B2 | 8/2009 | Battles et al. |
| 7,760,269 | B2 | 7/2010 | Ochs et al. |
| 7,840,032 | B2 | 11/2010 | Ofek |
| 7,899,270 | B2 | 3/2011 | Kim et al. |
| 8,174,562 | B2 | 5/2012 | Hartman |
| 8,269,822 | B2 | 9/2012 | Zalewski |
| 8,315,791 | B2* | 11/2012 | Bales ............... G01C 21/20 340/989 |
| 8,368,720 | B2 | 2/2013 | Peterson |
| 8,868,336 | B2* | 10/2014 | Suzuno ............ G01C 21/20 701/454 |
| 8,913,083 | B1* | 12/2014 | Ogale .............. G06F 17/30265 345/632 |
| 8,995,788 | B2 | 3/2015 | Williams et al. |
| 2001/0038718 | A1 | 11/2001 | Kumar et al. |
| 2002/0154812 | A1 | 10/2002 | Chen et al. |
| 2002/0167533 | A1 | 11/2002 | Tirumalai et al. |
| 2002/0176635 | A1 | 11/2002 | Aliaga et al. |
| 2002/0196188 | A1 | 12/2002 | Holt |
| 2005/0128196 | A1 | 6/2005 | Popescu et al. |
| 2006/0120625 | A1 | 6/2006 | Peleg et al. |
| 2007/0076920 | A1 | 4/2007 | Ofek |
| 2007/0103544 | A1 | 5/2007 | Nakazawa |
| 2007/0122058 | A1 | 5/2007 | Kitaura |
| 2008/0043020 | A1 | 2/2008 | Snow |
| 2008/0066000 | A1 | 3/2008 | Ofek |
| 2008/0140309 | A1 | 6/2008 | Jendbro |
| 2008/0291201 | A1 | 11/2008 | LaFon |
| 2008/0309668 | A1 | 12/2008 | Borovikov |
| 2009/0021576 | A1 | 1/2009 | Linder et al. |
| 2009/0031246 | A1 | 1/2009 | Cowtan et al. |
| 2009/0079730 | A1 | 3/2009 | Lee et al. |
| 2009/0116764 | A1 | 5/2009 | Liu |
| 2010/0014436 | A1 | 1/2010 | Talagery |
| 2010/0014780 | A1 | 1/2010 | Kalayeh |
| 2010/0033553 | A1 | 2/2010 | Levy |
| 2010/0110069 | A1 | 5/2010 | Yuan |
| 2010/0118116 | A1 | 5/2010 | Tomasz |
| 2010/0123737 | A1 | 5/2010 | Williamson |
| 2010/0157018 | A1 | 6/2010 | Lampotang et al. |
| 2010/0194851 | A1 | 8/2010 | Pasupaleti et al. |
| 2010/0201682 | A1 | 8/2010 | Quan |
| 2010/0215250 | A1 | 8/2010 | Zhu |
| 2010/0220893 | A1 | 9/2010 | Lee |
| 2010/0251101 | A1 | 9/2010 | Haussecker et al. |
| 2010/0259610 | A1 | 10/2010 | Petersen |
| 2010/0302280 | A1 | 12/2010 | Szeliski |
| 2010/0309293 | A1 | 12/2010 | Plut |
| 2011/0018902 | A1 | 1/2011 | Ofek |
| 2011/0043604 | A1 | 2/2011 | Peleg et al. |
| 2011/0096957 | A1 | 4/2011 | Anai et al. |
| 2011/0123120 | A1* | 5/2011 | Quack ............... G06F 17/30256 382/197 |
| 2011/0141141 | A1 | 6/2011 | Kankainen |
| 2011/0141229 | A1 | 6/2011 | Stec et al. |
| 2011/0158509 | A1 | 6/2011 | Li et al. |
| 2011/0158528 | A1 | 6/2011 | Yea et al. |
| 2011/0211040 | A1 | 9/2011 | Lindemann et al. |
| 2011/0265023 | A1 | 10/2011 | Loomis et al. |
| 2011/0279445 | A1 | 11/2011 | Murphy et al. |
| 2011/0279446 | A1 | 11/2011 | Castro et al. |
| 2011/0302527 | A1 | 12/2011 | Chen et al. |
| 2011/0304699 | A1 | 12/2011 | Ito |
| 2012/0036433 | A1 | 2/2012 | Zimmer et al. |
| 2012/0127158 | A1 | 5/2012 | Miyagi et al. |
| 2012/0133639 | A1 | 5/2012 | Kopf et al. |
| 2012/0294549 | A1 | 11/2012 | Doepke |
| 2013/0106990 | A1 | 5/2013 | Williams et al. |
| 2013/0155047 | A1 | 6/2013 | Williams et al. |
| 2013/0155180 | A1 | 6/2013 | Wantland et al. |
| 2013/0156326 | A1 | 6/2013 | Williams et al. |
| 2013/0242041 | A1* | 9/2013 | Hollinger ................ 348/36 |
| 2013/0249812 | A1* | 9/2013 | Ramos et al. ............. 345/173 |
| 2014/0002588 | A1* | 1/2014 | Ahiska ...................... 348/36 |
| 2015/0249786 | A1 | 9/2015 | Williams et al. |

FOREIGN PATENT DOCUMENTS

| | | |
|---|---|---|
| CN | 1845094 A | 10/2006 |
| CN | 101251958 | 8/2008 |
| CN | 101666656 A | 3/2010 |
| CN | 101841727 | 9/2010 |
| CN | 101852620 A | 10/2010 |
| CN | 101923709 | 12/2010 |

OTHER PUBLICATIONS

Micusik, et al., "Piecewise Planar City 3D Modeling from Street View Panoramic Sequences"—Published Date: Jun. 20-25, 2009, Proceedings: Computer Vision and Pattern Recognition, 2009. CVPR 2009. IEEE Conference, pp. 2906-2912, http://ieeexplore.ieee.org/stamp/stamp.jsp?tp=&arnumber=5206535.

Kopf, et al., "Street Slide: Browsing Street Level Imagery"—Published Date: Jun. 20-25, 2009, Proceedings: Computer Vision and Pattern Recognition, 2009. CVPR 2009, IEEE Conference, http://research.microsoft.com/en-us/um/people/cohen/street_slide.pdf.

Kroepfl, et al., "Efficiently Locating Photographs in Many Panoramas"—Published Date: 2010, Proceedings: 18th SIGSPATIAL International Conference on Advances in Geographic Information Systems, http://research.microsoft.com/en-us/um/people/cohen/street_slide.pdf.

Second Office Action Issued in Chinese Patent Application No. 201210541675.8, Mailed Date: Oct. 19, 2015, 12 Pages.

Agarwala, Aseem, "Photographing long scenes with multi-viewpoint panoramas", Published Date: 2006, http://vis.berkeley.edu/papers/longScenes/LongThings.pdf, 9 pgs.

Brown, et al., "Automatic Panoramic Image Stitching using Invariant Features", Retrieved at <<http://mesh.brown.1edu/engn1610/pdfs/Brown-ijcv2007.pdf>>, International Journal of Computer Vision, vol. 47, No. 1, 2007, pp. 59-73.

Chinese 1st Office Action cited in Chinese Application No. 201210540664.8, mailed Oct. 10, 2014, 5 pgs.

Chinese 1st Office Action cited in Chinese Application No. 201210540807.5, mailed May 16, 2014, 6 pgs.

Chinese 2nd Office Action cited in Chinese Application No. 201210540664.8, mailed Jun. 12, 2015, 9 pgs.

Chinese 2nd Office Action cited in Chinese Application No. 201210540807.5, mailed Jan. 6, 2015, 3 pgs.

Chinese Notice of Allowance in Application 201210540807.5, mailed Mar. 2, 2015, 6 pgs.

Chinese Office Action Reply filed in in Chinese Application No. 201210540807.5, dated Sep. 28, 2014, 6 pgs.

Fleck, et al., "Graph Cut based Panoramic 3D Modeling and Ground Truth Comparison with a Mobile Platform—The Wagele", Retrieved at <<http://ieeexplore.ieee.org/stamp/stamp.jsp?tp=&arnumber=1640374>>, The 3rd Canadian Conference on Computer and Robot Vision, Jun. 7-9, 2006, pp. 10.

http://www.superhighstreet.com, front page, About Us page, and Help & FAQ pages, 6 pages, Feb. 12, 2008.

Kopf et al., "Street Slide: Browsing Street Level Imagery", Published Date: 2010, http://research.microsoft.com/pubs/121744/Kopf-sg10.pdf, 8 pgs.

Kopf; et al., "Street Slide: Browsing Street Level Imagery", Retrieved Oct. 21, 2011, http://research.microsoft.com/en-us/um/people/cohen/street_slide.pdf.

(56) References Cited

OTHER PUBLICATIONS

Levin, et al., "Seamless Image Stitching in the Gradient Domain", Retrieved at <<http://cs.engr.uky.edu/jacobs/classes/2010_photo/readings/gradient_domain_stitching.pdf>>, Eighth European Conference on Computer Vision (ECCV), 2004, pp. 12.

PCT International Search Report cited in PCT Application No. PCT/US2012/067813, mailed Mar. 22, 2013, 9 pgs.

PCT International Search Report, Mail Date: Mar. 26, 2013, Application No. PCT/US2012/069951, Filed date: Dec. 14, 2012, pp. 9.

PCT Preliminary Report cited in PCT Application No. PCT/US2013/069951, mailed Jun. 17, 2014, 5 pgs.

Pollefeys, M., "Detailed Real-Time Urban 3D Reconstruction from Video—Springer." Detailed Real-Time Urban 3D Reconstruction from Video—Springer. Oct. 20, 2007, Web. Apr. 21, 2014.

Rav-Acha et al., "Minimal Aspect Distortion (MAD) Mosaicing of Long Scenes", International Journal of Computer Vision, vol. 28, Issue 2-3, Jul. 2008, pp. 187-206.

Roman et al., "Automatic Multiperspective Images", Proceedings of the 17th Eurographics Conference on Rendering Techniques, 2006.

Shade, Jonathan et al., "Layered Depth Images", Jul. 19-24, 1998, in Proceedings of the 25th Annual Conference on Computer Graphics and Interactive Techniques (SIGGRAPH 1998), Orlando, Florida, ed. SIGGRAPH and Michael Cohen, 13 pgs.

Simonite, Technology Review, "A Smoother Street View", Published Date: Jul. 28, 2010, http://www.technologyreview.in/web/25880/, 4 pgs.

Szeliski, Richard, "Image Alignment and Stitching: A Tutorial", Published Date: Dec. 10, 2006, http://research.microsoft.com/pubs/70092/tr-2004-92.pdf, 89 pgs.

U.S. Appl. No. 12/957,124, Amendment and Response filed Oct. 29, 2013, 15 pgs.

U.S. Appl. No. 12/957,124, Amendment and Response filed Jun. 10, 2014, 13 pgs.

U.S. Appl. No. 12/957,124, Amendment and Response filed Jul. 19, 2013, 14 pgs.

U.S. Appl. No. 12/957,124, Notice of Allowance mailed Jul. 22, 2014, 8 pgs.

U.S. Appl. No. 12/957,124, Office Action mailed Mar. 10, 2014, 17 pgs.

U.S. Appl. No. 12/957,124, Office Action mailed Apr. 22, 2013, 22 pgs.

U.S. Appl. No. 12/957,124, Office Action mailed Jul. 31, 2013, 25 pgs.

U.S. Appl. No. 13/286,756, Amendment and Response filed Oct. 3, 2014, 12 pgs.

U.S. Appl. No. 13/286,756, Office Action mailed Nov. 18, 2014, 18 pgs.

U.S. Appl. No. 13/286,756, Office Action mailed Apr. 3, 2014, 19 pgs.

U.S. Appl. No. 13/325,430, Amendment and Response filed Dec. 21, 2014, 16 pgs.

U.S. Appl. No. 13/325,430, Amendment and Response filed Jul. 27, 2015, 15 pgs.

U.S. Appl. No. 13/325,430, Office Action mailed Mar. 25, 2015, 18 pgs.

U.S. Appl. No. 13/325,430, Office Action mailed Jun. 20, 2014, 12 pgs.

U.S. Appl. No. 13/325,466, Amendment and Response filed May 4, 2015, 13 pgs.

U.S. Appl. No. 13/325,466, Office Action mailed Nov. 7, 2013, 14 pgs.

U.S. Appl. No. 13/325,466, Office Action mailed Dec. 4, 2014, 16 pgs.

U.S. Appl. No. 13/325,466, Office Action mailed Apr. 24, 2014, 15 pgs.

U.S. Appl. No. 13/325,466, Office Action mailed Sep. 10, 2015, 6 pgs.

U.S. Appl. No. 13/325,466, Reply to Office Action filed Oct. 24, 2014, 12 pgs.

U.S. Appl. No. 13/325,466, Reply to Office Action filed Feb. 7, 2014, 11 pgs.

Xiao; et al., "Image-based Facade Modeling", Published Dec. 2008, Proceedings: ACM Transactions on Graphics (TOG) Proceedings of SIGGRAPH Asia 2008, http://web.mit.edu/jxiao/Public/publication/2008/TOG_facade/paper_low-res.pdf.

Xiao; et al., "Image-based street-side city modeling", Published Dec. 2009, Proceedings: ACM SIGGRAPH Asia 2009, http://md1.csa.com/partners/viewrecord.php?requester=gs&collection=TRD&recid=201006340377341CI&q=&uid=788264198&setcookie=yes.

U.S. Appl. No. 13/325,612, Office Action mailed May 15, 2014, 13 pgs.

U.S. Appl. No. 13/325,612, Amendment and Response filed Nov. 17, 2014, 10 pgs.

U.S. Appl. No. 13/325,612, Notice of Allowance mailed Dec. 1, 2014, 7 pgs.

Yining Deng et al., "Generating Panorama Photos", Proceedings of SPIE vol. 5242 Internet Multimedia Management Systems IV, (SPIE, Bellingham, WA, 2003), pp. 270-279.

Zheng, Jiang Yu, "Stabilizing Route Panoramas"—Published Date: Aug. 23-26, 2004, Proceedings: 17th International Conference on Pattern Recognition, vol. 1, http://www.cs.iupui.edu/.about.jzheng/deshaking.pdf.

U.S. Appl. No. 13/325,430, Office Action mailed Sep. 16, 2015, 22 pgs.

U.S. Appl. No. 13/325,466, Amendment and Response filed Dec. 9, 2015, 9 pgs.

First Chinese Office Action cited in Chinese Application No. 201210541670.8 dated Feb. 16, 2015, 3 pgs.

Int. Search Report cited in PCT Application No. PCT/US2012/069954 dated Apr. 29, 2013, 12 pgs.

Int. Preliminary Report cited in PCT Application No. PCT/US2012/069954 dated Jun. 17, 2014, 6 pgs.

\* cited by examiner

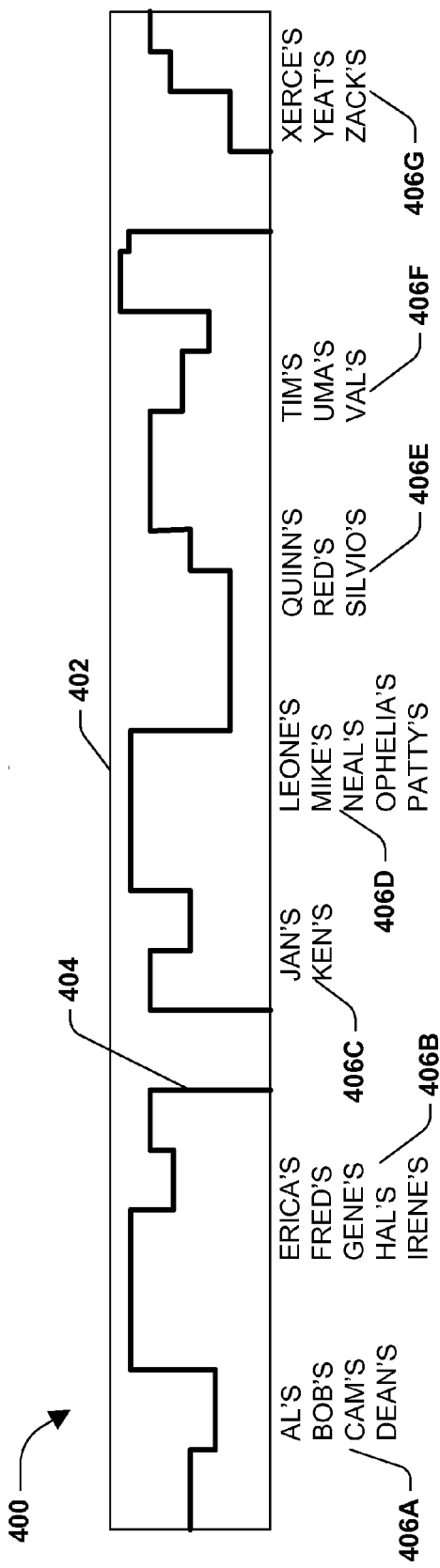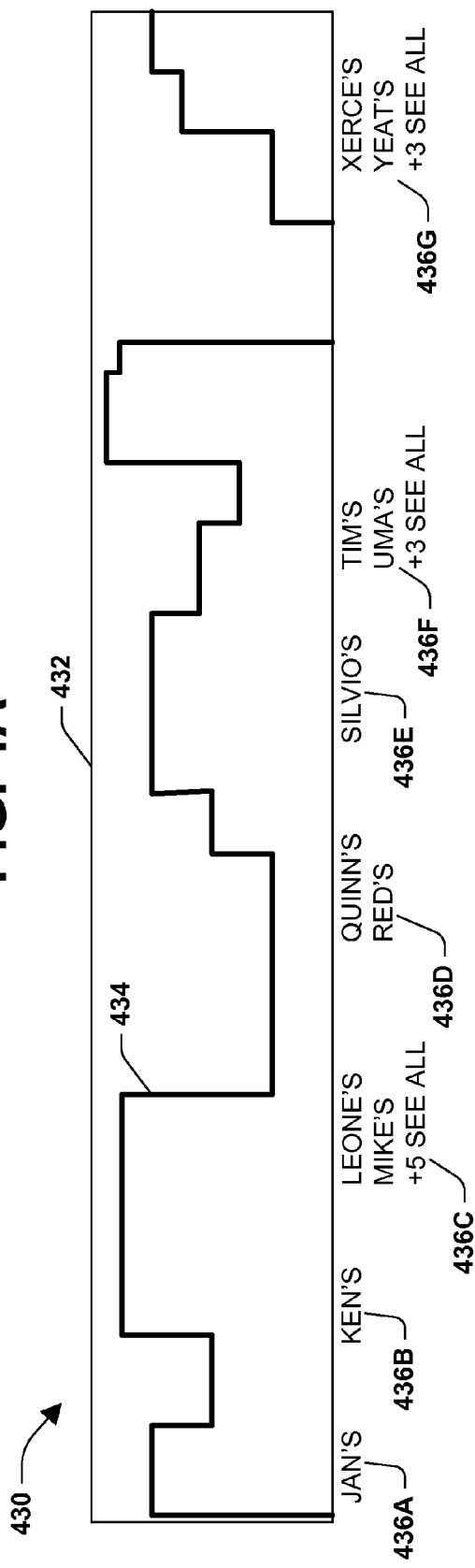

POINT OF INTEREST (POI) DATA POSITIONING IN IMAGE

BACKGROUND

Digital photography can allow for a sequence of images to be stitched or glued together to provide for a relatively seamless transition from one image to the next. Further, images, such as side-view images, can be collected while traveling along a route, such as a street. Stitching these side-view images together can provide a user experience of travelling along the route, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A side or lateral-view of panoramic imagery may comprise a series of images (e.g., photo frames, video frames, etc.) stitched/glued together to form a somewhat seamless view of the imagery. This type of planer panorama imagery typically displays many of the stitched together images at a same time. Currently, images stitched together in this manner can be utilized in conjunction with digital mapping services, where, for example, a user may view planer panorama-type images of a street associated with a map they may be viewing.

Point-of-interest (POI) information can be provided in a display comprising a planar panorama image, for example, where the POI information may be relatively co-located with the associated POI (e.g., building, historic location, street, business, geo-location, city, etc.). However, when there are a large number of co-located geographic points, comprising POIs (e.g., businesses in an office building, stores in a mall, exhibits in a park or gallery, etc.), the visual display of the respective POI information may overlap and/or be obscured (by one another). Further, these types of planar panorama images often provide low accuracy for geo-locations associated with a POI; and when an image is zoomed out, there may be a higher density of the POIs, resulting in confusion to the viewer.

Accordingly, among other things, one or more techniques and/or systems are disclosed that can provide for improved clustering of POI information or data in a planar panorama image, for example, particularly where there may be a high density of POIs at a location (e.g., when zoomed out). Respective POI geo-locations can be identified for one or more POIs for a particular view of the planar panorama image, and a common, cluster geo-location may be identified, where appropriate. As an example, instead of locating respective POI data tags at their corresponding (e.g., and possibly inaccurate, overlapping, etc.) geo-location, the tags may be clustered together (in an orderly manner) at the common, cluster geo-location. The planar panorama image may be rendered with the appropriate one or more clusters of one or more data tags.

In one embodiment of positioning point-of-interest (POI) data in a planar panorama image, first POI data that comprises a first geo-location, and second POI data that comprises a second geo-location, can be received. Further, a first data tag can be created, comprising at least a portion of the first POI data, and a second data tag can be created, comprising at least a portion of the second POI data. Additionally, the first data tag and second data tag can be clustered at a cluster geo-location in the planar panorama image. The cluster geo-location may be based at least upon the first geo-location and the second geo-location. It may be appreciated that, unless indicated to the contrary, terms such as first, second and/or the like are merely used herein as identifiers, and are not meant to imply an ordering, sequence, temporal aspect, finite or limited number or grouping of items, terms, etc., and thus are not meant to limit the scope of the instant application, including the appended claims, in such a manner.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIGS. 4A, 4B, and 4C illustrate example embodiments where one or more portions of one or more techniques described herein may be implemented.

DETAILED DESCRIPTION

Figure 1:
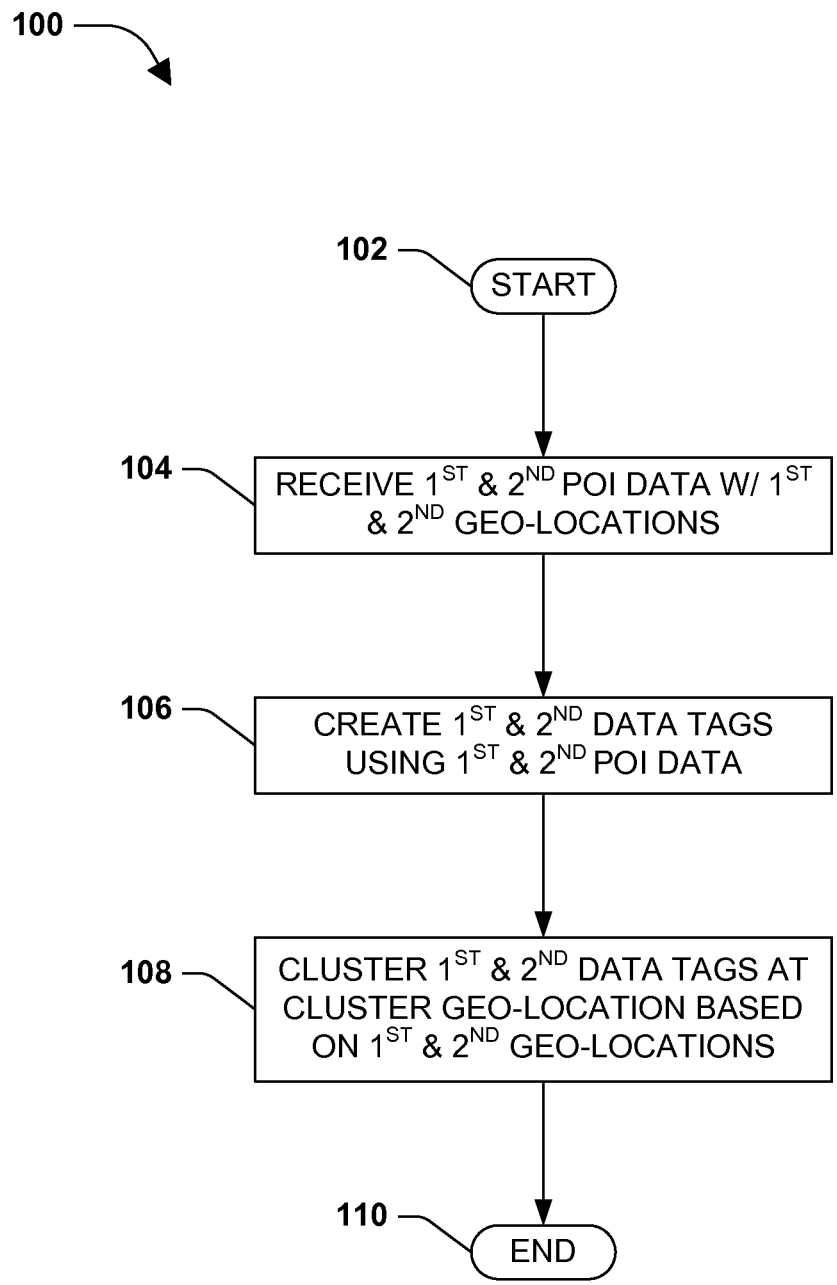
FIG. 1 is a flow diagram illustrating an exemplary method for positioning point-of-interest data in a planar panorama image.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Among other things, as provided herein, a method may be devised that provides for rendering point-of-interest (POI) data or information for a planar panorama image, where the POI data can be located in relative proximity to an actual location (e.g., geo-location) of the POI in the image. Further, when the image is altered, such as by zooming in and/or out, a location of the POI information may be appropriately adjusted to provide a relatively accurate location of the POI. Additionally, the POI information for more than one POI may be clustered together when the zoom level of the image may otherwise cause the POI information to overlap or obscure other data in the image.

FIG. 1 is a flow diagram illustrating an exemplary method 100 for positioning point-of-interest (POI) data in a planar panorama image. The exemplary method 100 begins at 102. At 104, first POI data, comprising a first geo-location, and second POI data, comprising a second geo-location, are received. POI data can comprise, among other things, information related to a POI (e.g., an object, location, entity, etc.) in the image, such as an entity name (e.g., business name, etc.), information about an entity (e.g., contact information, hours of operation, etc.), updated information about an entity (e.g., online ratings, user-submitted content, etc.), and/or updated information about a location (e.g., online user-submitted information, weather updates, news, images, etc.), for example. Further, as an example, a geo-location can comprise data that identifies a location in the image, such as coordinates (e.g., grid-coordinates, latitude/longitude, etc.), and/or an address.

At 106, a first data tag, comprising at least a portion of the first POI data, and a second data tag, comprising at least a portion of the second POI data, are created. A data tag can comprise, for example, a piece of information that can be included with a rendered version of the planar panorama image. As one example, the data tag may comprise text of at least a portion of the POI data (e.g., name, descriptor, etc.), an icon that may be representative of at least a portion of POI data (e.g., a bus-stop icon, logo, etc.), and/or an image (e.g., user-submitted image and/or portion of video, etc.) that may be representative of at least a portion of POI data.

At 108, the first data tag and second data tag are clustered at a cluster geo-location in the planar panorama image. The cluster geo-location is based at least upon the first geo-location and the second geo-location. As one example, both the first and second tags may not properly fit (e.g., to provide a desired user experience) in the planer panorama image display, due to a proximity of the first and second geo-locations to each other. For example, the first and second geo-locations may indicate adjacent businesses (e.g., or businesses in a same building) in the planar panorama image. However, in this example, due to a viewable (e.g., font) size of the data tags for the image, the first and second data tags may overlap, obscure, and/or otherwise interfere with one another if placed in proximity with their respective geo-locations (e.g., business locations). Therefore, in this example, the first and second data tags can be clustered together at the cluster geo-location where the cluster geo-location may comprise a location between (e.g., or at) the first and second geo-locations.

Having clustered the first and second data tags in the planar panorama image, the exemplary method 100 ends at 110.

Figure 2:
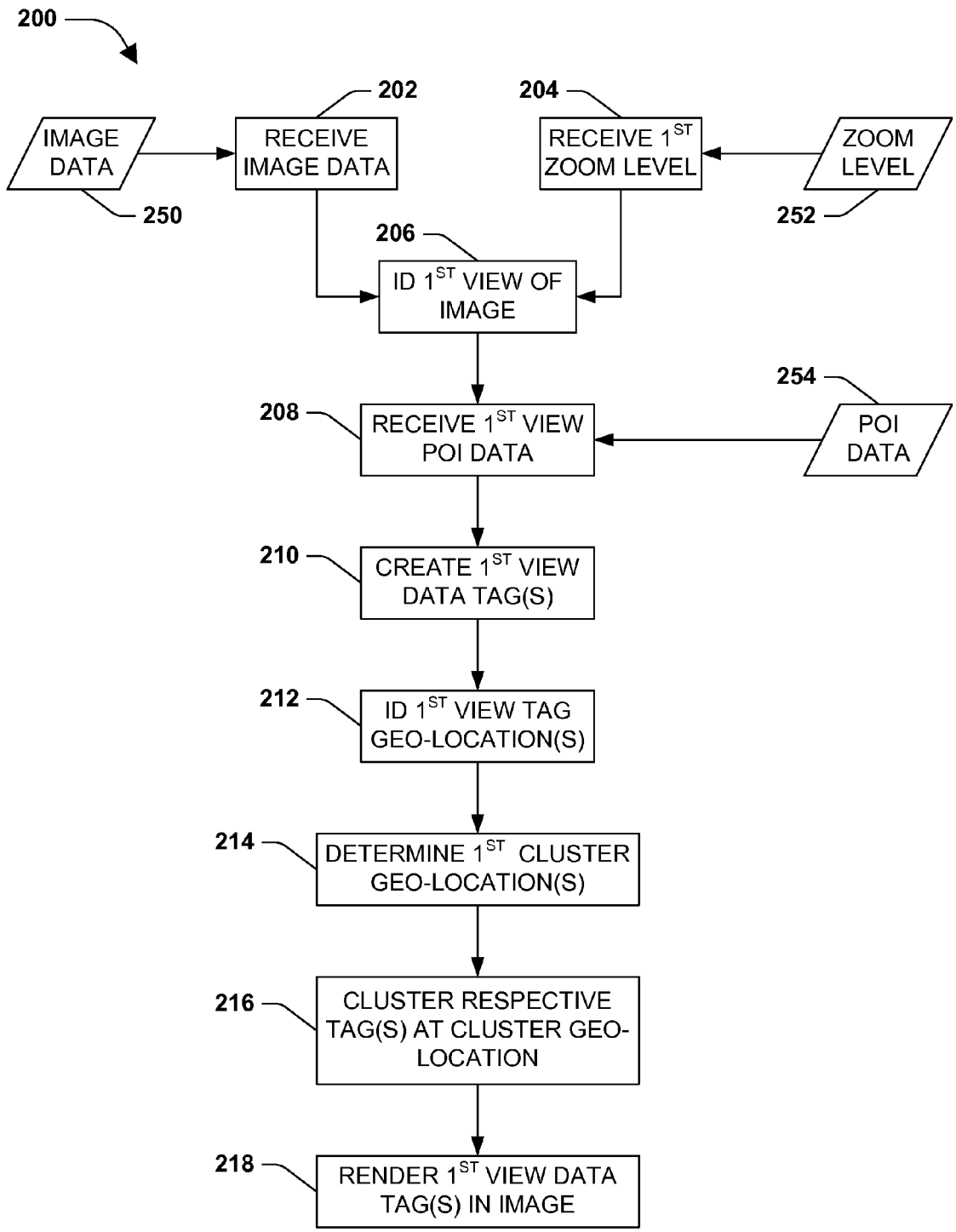
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. At 202, image data 250 can be received, such as image data indicative of a portion of a planar panorama image (e.g., a human-scale, street-level image of a portion of one side of a roadway). At 204, a first zoom level 252 for the image data 250 may be received, such as indicating how much of the planar panorama image may be comprised within a viewing window rendered on a display. As one example, when the planar panorama image is initially rendered for viewing on a display by a user, a particular portion of the image will be rendered that can be apportioned based on an initial (e.g., default) zoom level (e.g., the first zoom level), where the zoom level may dictate how much of the planar panorama image is displayed, and/or how much detail is displayed in the planar panorama image.

At 206, a first view for the planar panorama image can be identified, for example, based on the received image data 250 and the received indication of the first zoom level 252. As an illustrative example, FIG. 4A illustrates an example embodiment 400 where one or more portions of one or more techniques described herein may be implemented. In this example 400, a planar panorama image 402 comprises street-side imagery 404, such as buildings, landscape, etc. Further, in this example, the image 402 may be zoomed to a level (e.g., the first zoom level) that allows a large portion, amount, etc. of the imagery 404 to be included in the image 402 (e.g., a wide-view of the street-level imagery).

Returning to FIG. 2, at 208, POI data 254 for the first view of the planar panorama image (e.g., 402 of FIG. 4) can be received. As described above, POI data can comprise, among other things, an entity name, entity metadata, updated entity metadata, and/or update location metadata, as one example. Further, the POI data can comprise a geo-location, for example, where at least a portion of the POI data is associated with the geo-location. For example, POI data comprising a business name may be associated with the geo-location for that business (e.g., an address, latitude, longitude, global positioning system (GPS) data, grid coordinate, etc.). In one embodiment, POI data available for entities and/or locations in the first view of the planar panorama image may be received.

Figure 4C:
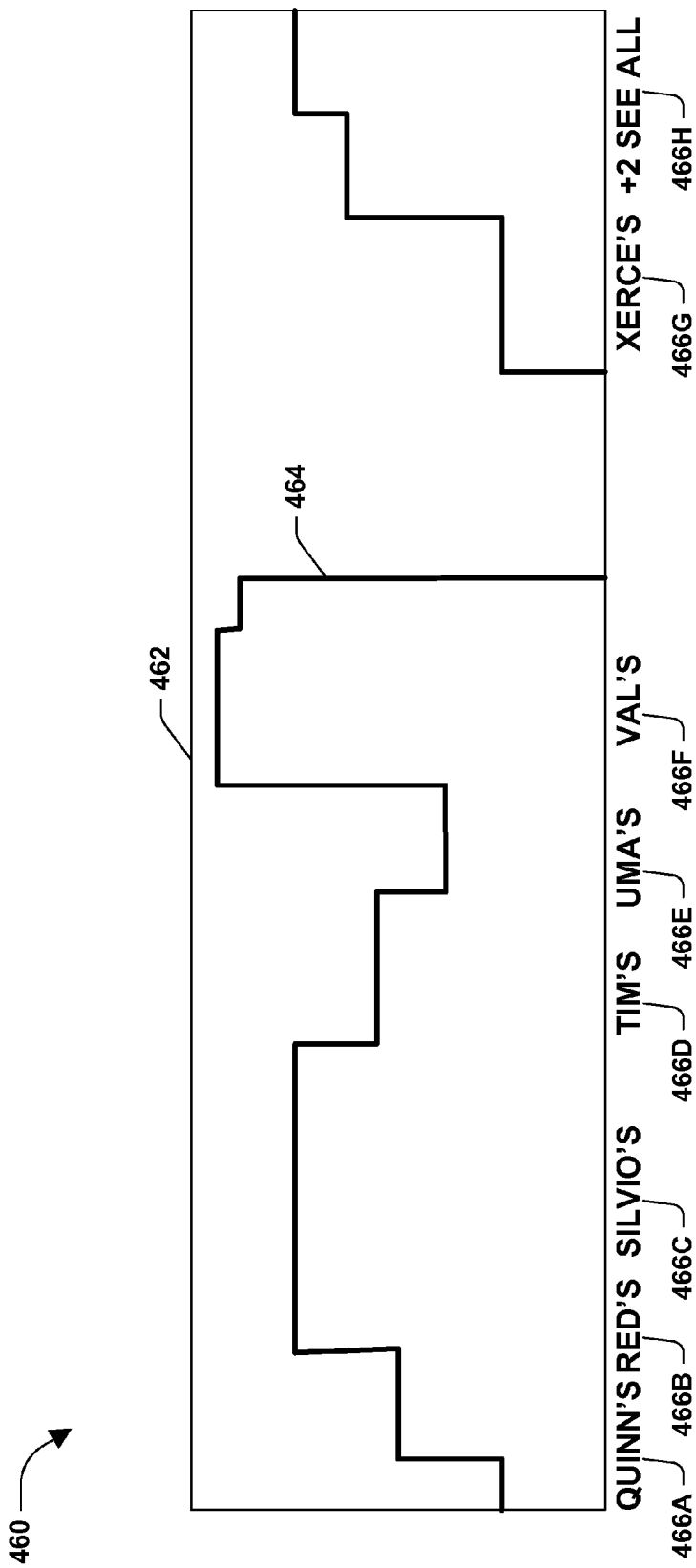
Figure 5:
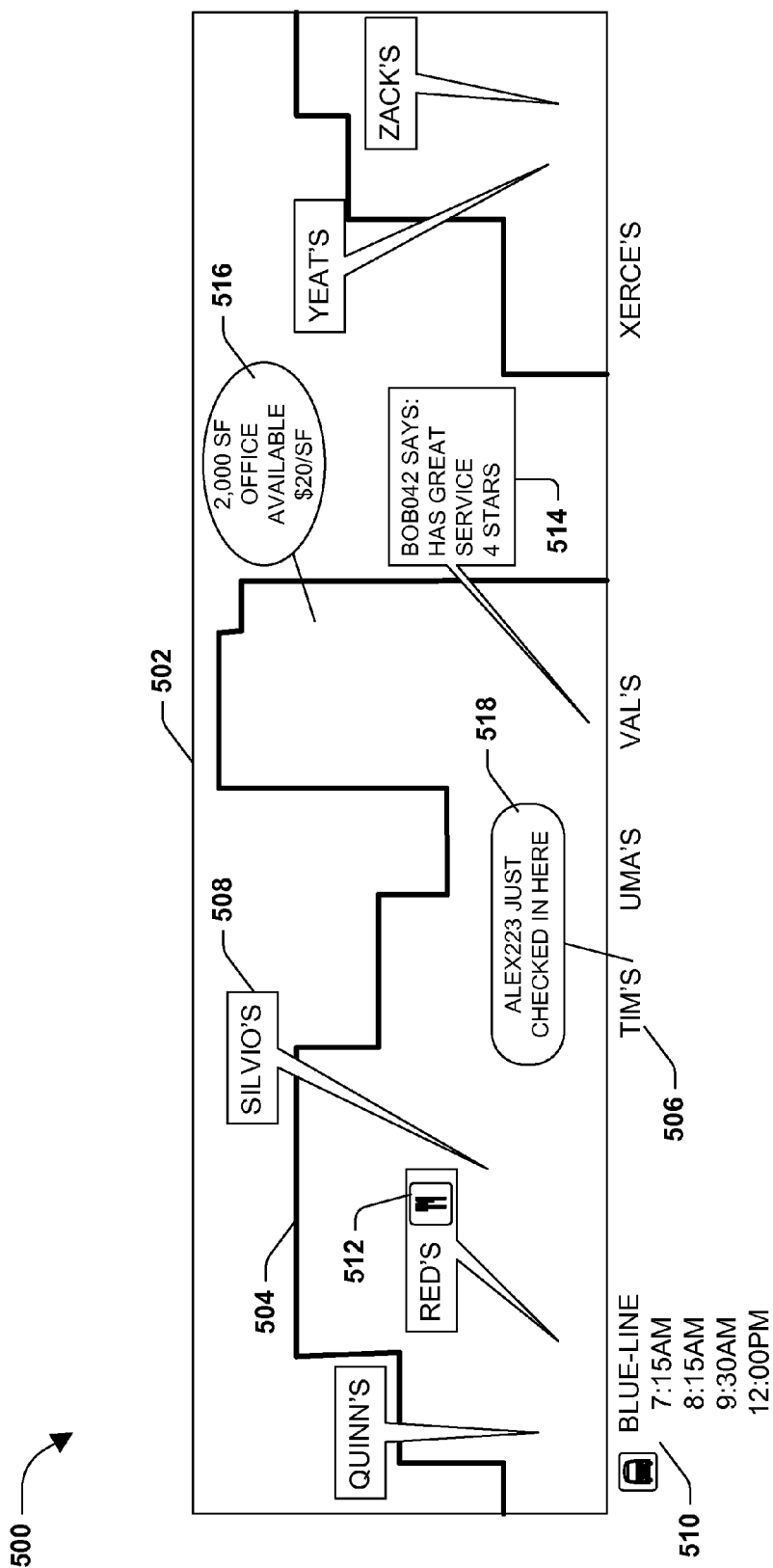
FIG. 5 illustrates an example embodiment where one or more portions of one or more techniques described herein may be implemented.

At 210, one or more data tags can be created for the first view of the planar panorama image. As described above, a data tag may comprise at least a portion of the POI data, for example, such as text, an icon, and/or an image. As an illustrative example, in FIG. 4A, data tags can comprise text, in this case, comprising a name of a business and/or location comprised in (e.g., or at least encompassed by) the planar panorama image. As another illustrative example, FIG. 5 illustrates an example embodiment 500 where one or more portions of one or more techniques described herein may be implemented. In this example embodiment 500, a data tag 510 may comprise an icon and/or a graphic (e.g., bus-stop sign), another data tag 512 may comprise an image (e.g., associated with an entity, captured at the location, etc.), and yet another data tag 508, 514, 516, may comprise a type of text box.

In one embodiment, a display size of a data tag may be determined based at least upon received POI data (e.g., 254 of FIG. 2). Further, in one embodiment, the display size of the data tag may be determined based at least upon a desired tag window size. As one example, a tag window may comprise a portion of a display, comprising the planar panorama image, in which the data tag may be rendered. The desired tag window size may comprise a dimension that accommodates the data tag, for example, in a manner that provides a desired display arrangement (e.g., taking up a desired portion of the display, in a desired font type and/or tag size, etc.).

Further, as one example, the POI data used in the data tag may help determine the display size of the data tag. For example, text comprising a number of characters may utilize one size, while an image may utilize another size. As an illustrative example, FIG. 4C illustrates an example embodiment 460 where one or more portions of one or more techniques described herein may be implemented. In this example 460, the data tags comprise a larger display size than rendered in a previous display (e.g., 400 of FIG. 4A). The font type and/or font size, in this example, can help determine the display size for the data tag, where the larger font may result in a larger display size for the tag (e.g., and a smaller font resulting in a smaller sized tag).

Returning to FIG. 2, at 212, a geo-location can be identified for the respective one or more data tags created for the first view of the planar panorama image. As described above, the POI data 254 that is used for a data tag can also comprise a geo-location, for example. In one embodiment, the geo-location information from the POI data 254 may be compared with location information associated with the planar panorama image (e.g., captured at image capture).

As one example, when the imagery (e.g., a collection of relatively sequential images) used for the planar panorama image is collected (e.g., while traveling along a roadway comprising the imagery), geo-location information may also be collected (e.g., addresses, GPS data, etc.). In this example, the POI geo-location can be matched to imagery geo-location information to determine whether the POI may be located in the first view of the planar panorama image. If the POI geo-location associated with the data tag is located in the first view of the planar panorama image, an appropriate (e.g., approximate) location in the imagery for the data tag may be identified.

At 214, one or more cluster geo-locations may be determined for the one or more data tags. As one example, a cluster geo-location can comprise a location where one or more data tags may be clustered for the planar panorama image. In one embodiment, determining the cluster geo-location can comprise identifying a geo-location that is disposed between a first geo-location and a second geo-location, if the first geo-location and the second geo-location comprise different geo-locations. As an illustrative example, in FIG. 4A, a cluster geo-location for Jan's and Ken's 406C may be located approximately in the middle between Jan's geo-location and Ken's geo-location. In this example, because the data tags for Jan's and Ken's 406C may have (at least partially) overlapped, obscured, etc. one another (e.g., due to their respective display sizes) if placed at their respective geo-locations in the planar panorama image 402, a cluster geo-location can be identified between the two.

In one embodiment, determining the cluster geo-location can comprise identifying a geo-location disposed at the first geo-location and the second geo-location, if the first geo-location and the second geo-location comprise a same geo-location. That is, for example, an office building may comprise a plurality of businesses, respectively comprising a same geo-location (e.g., address, GPS coordinate, etc.). In this example, the cluster geo-location may comprise the same geo-location as the respective POIs (e.g., businesses) in the data tags.

Returning to FIG. 2, at 216, the respective one or more data tags can be clustered at their respective cluster geo-locations. It may be appreciated that location data for a POI, data tag, etc., for example, in a planar panorama image may comprise a less than precise and/or accurate location of the POI, data tag, etc. As an example, an address of a business may not always align precisely with a physical location of the business in an image (e.g., and/or a digital map). That is, a POI geo-location that is matched to a geo-location of a corresponding object (e.g., building) in an image may be slightly offset, misaligned, etc. from the object due to imprecisions and/or inaccuracies in the underlying data. Accordingly, clustering as provided herein may accommodate for such imprecisions and/or inaccuracies to provide a satisfying user experience such as by providing approximate clustering locations. For example, a cluster geo-location located approximately midway between two (or more) POIs, data tags, etc. substantially obviates issues that may have arisen should the respective geo-locations for the POIs, data tags, etc. have been less than precise and/or accurate (e.g., due to imprecisions and/or inaccuracies in the underlying data). That is, because the POIs, data tags, etc. are located elsewhere from their respective geo-locations, issues related to imprecisions and/or inaccuracies of these geo-locations are rendered substantially moot. At 218, the one or more clustered data tags can be rendered in the first view of the planar panorama image, such as at a corresponding geo-location. As an illustrative example, in FIG. 4A, a first set of data tags are rendered at a first cluster geo-location 406A in the planar panorama image 402, a second set of data tags are rendered at a second cluster geo-location 406B, a third set of data tags are rendered at a third cluster geo-location 406C, and so-on (e.g., for remaining cluster geo-locations 406D-406G).

In one embodiment, the clustering may be based at least upon the first zoom level (e.g., comprising the view of the planar panorama 402 in FIG. 4A). That is, for example, a zoomed-out view of the planar panorama, such as in FIG. 4A, combined with the display size of the respective data tags, may be used to determine how the data tags are clustered. As one example, at cluster geo-location 406E, the geo-locations for Quinn's, Red's and Silvio's may be comprised within an area in the planar panorama 402 that comprises the display size of the data tags (e.g., the businesses Quinn's, Red's and Silvio's are located in the space covered by the display size of the tags). In this example, the respective data tags may overlap one another if they were not combined at the cluster geo-location 406E.

In one embodiment, the clustering can comprise rendering one or more data tags in a list form at or co-located with a corresponding cluster geo-location. As an illustrative example, in FIG. 4A, the data tags are rendered in list form at the respective cluster geo-locations 406 (A-G). Further, in one embodiment, one or more of the data tags may be rendered outside of the planar panorama image. As an illustrative example, in FIG. 4A, the respective data tags are co-located outside of the planar panorama image 402, at their corresponding cluster geo-locations 406 (A-G).

In one embodiment, the clustering can comprise rendering the one or more data tags in a non-list form, where the respective one or more data tags can comprise a pointer to a corresponding cluster geo-location. Further, in one embodiment, the rendering can comprise locating at least a portion of the respective data tags, over the planar panorama image. As an illustrative example, in FIG. 5, the example embodiment 500 comprises the planar panorama image 502, where data tags 508, 512, 514, 516, 518 are rendered in a non-list form (e.g., text boxes, images, icons, text bubbles, etc.) at least partially over the planar panorama image 502, and where these data tags 508, 512, 514, 516, 518 respectively comprise a pointer to their corresponding geo-locations (e.g., cluster geo-location).

Figure 3:
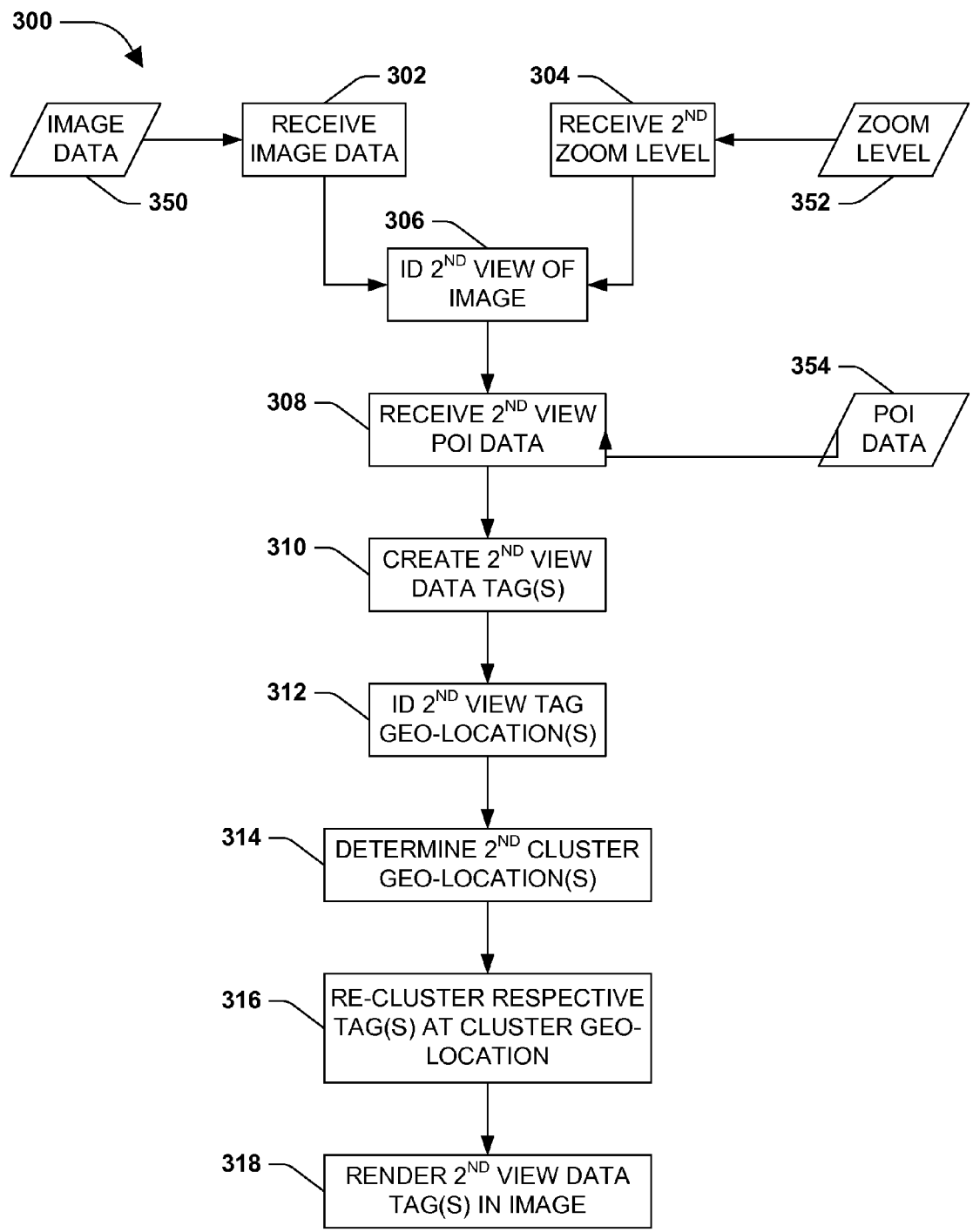
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302, image data 350 for a planar panorama image may be received, and an indication of a second zoom level 352 for the planar panorama image can be received, at 304. As an illustrative example, FIGS. 4B and 4C illustrate example embodiments 430, 460 where one or more portions of one or more techniques described herein may be implemented. The example embodiment 430 may comprise an example of the planar panorama image 432 "zoomed-in" from the first zoom level (e.g., the planar panorama image 402 of FIG. 4A). Further, the example embodiment 430 may comprise an example of the planar panorama image 432 "zoomed-out" from the planar panorama image 460 of FIG. 4C. That is, for example, the second zoom level for the planar panorama image may comprise a zoomed-in or zoomed-out view from a previous view (e.g., the first view of FIG. 2, or of FIG. 4C) of the planar panorama image.

Returning to FIG. 3, at 306, the received image data 350 and received indication of the second zoom level 352 may be used to identify a second view for the planar panorama image. As an illustrative example, in FIG. 4B, the planar panorama image 432 (e.g., the second view) comprises less street side imagery 434 than in the image 402 of FIG. 4A. That is, in this example, because the planar panorama image 432 comprises a zoomed-in view, it comprise fewer objects, but more detail (e.g., comprising a right two-thirds (approximately) of the street side imagery 404 of FIG. 4A).

Returning to FIG. 3, at 308, POI data 354 for the second view of the planar panorama image can be received. As an example, the POI data 354 for the second view may comprise at least some (e.g., or all) of the POI data from a first view (e.g., 254 of FIG. 2), particularly if the second view comprises a zoomed in view from the first view (e.g., from 402 of FIG. 4A to 432 of FIG. 4B). As another example, the POI data 354 for the second view may comprise more data than that of the first view, if the second view comprises a zoomed-out view from the first view (e.g., from 462 of FIG. 4C to 432 of FIG. 4B). For example, as described above, the zoomed out view may comprise more street-side imagery (e.g., 434 of FIG. 4B), comprising more objects, thereby potentially comprising more POIs.

At 310, one or more data tags for the second view of the planar panorama image can be created, and a geo-location for the respective one or more data tags can be identified, at 312. At 314, second view cluster geo locations may be determined, and the respective one or more data tags for the second view may be re-clustered at their corresponding cluster geo-locations at 316. As one example, re-clustering can comprise adding one or more data tags to a previous cluster of data tags, if the second zoom level is a zoomed-out view (e.g., comprising more street-level imagery in a similar space); or re-clustering can comprise separating one or more data tags from a previous cluster of data tags, if the second zoom level is a zoomed-in view of the planar panorama image (e.g., comprising less street-level imagery in a similar space).

In one embodiment, at least a third data tag (e.g., and more) may be re-clustered with a first data tag and a second data tag at the cluster geo-location, where the second zoom level comprises a zooming-out from the first zoom level. In this embodiment, the first and second data tags may have been clustered together at the cluster geo-location in the planar panorama imagery comprising the first zoom level. Further, the third data may be re-clustered at the cluster geo-location if a first geo-location for the first data tag, a second geo-location for the second data tag, and the third geo-location for the third data tag are disposed in an area of the planar panorama image that comprises a size of at least one of the data tags.

As an illustrative example, in FIGS. 4A, 4B, and 4C, the first zoom level may comprise the planar panorama image 432 of FIG. 4B, where a first and second data tag, Quinn's and Red's respectively, are clustered at a first cluster geo-location 436D. In this example, the second zoom level may comprise the (zoomed-out) planar panorama image 402 of FIG. 4A, where a third data tag, Silvio's, is re-clustered at a second cluster geo-location 406E, with the first and second data tags, Quinn's and Red's. Further, in the example embodiment 400, the geo-location for Silvio's is comprised within the desired size of the data tags, Quinn's and Red's, in the planar panorama image 402, and, therefore, Silvio's is also re-clustered at the same cluster geo-location 406E as Quinn's and Red's.

In one embodiment, re-clustering can comprise locating the first data tag at the first geo-location and the second data tag at the second geo-location, if the second zoom level comprises a zooming-in from the first zoom level. Further, in this embodiment, the first data tag and the second data tags can be re-clustered at their respective geo-locations if the first geo-location and the second geo-location are not disposed in an area of the planar panorama image that comprises a desired size of the first data tag and/or the second data tag, for example.

As an illustrative example, the first zoom level may comprise the planar panorama image 432 of FIG. 4B, where the first and second data tags, Quinn's and Red's respectively, are clustered at the first cluster geo-location 436D. In this example, the second zoom level may comprise the (zoomed-in) planar panorama image 462 of FIG. 4C, where the first data tag, Quinn's, is re-clustered at the first geo-location 466A, and the second data tag Red's is re-clustered at the second geo-location 466B. In this example, the respective first and second geo-locations 466A, 466B are no longer comprised within the area covered by the other's data tags, and can therefore be separated.

Returning to FIG. 3, at 318, the one or more data tags can be rendered in the second view of the planar panorama image. As an illustrative example, in FIG. 4B, the respective data tags are rendered at their corresponding cluster geo-locations 436A-436G. In one embodiment, the display to which the planar panorama image (e.g., 432) is rendered may not be able to display the respective data tags clustered at a cluster geo-location. As an example, the cluster geo-location 436C comprises five data tags, and the respective cluster geo-locations 436F, 436G comprise three data tags. In this example, an indicator tag can be included at the cluster geo-location 436C, 436F, 436G that indicates to a user that the remaining, undisplayed data tags may be viewed by selecting the indicator tag. As an example, upon selecting the indicator tag, the respective data tags can be displayed over the planar panorama image 434.

As another illustrative example, in FIG. 4C, a zoomed-in view of the planar panorama image 462 comprises the respective data tags at their corresponding cluster geo-locations 466. In one embodiment, where merely one data tag is clustered (e.g., or re-clustered) at a cluster geo-location, the cluster geo-location may correspond to the geo-location for the POI data associated with the data tag. As an example, the cluster geo-locations 466A-466G, comprising their corresponding rendered data tags, correspond to the geo-location from the received POI for the data tag (e.g., the business location).

In one embodiment, the display size of one or more of the data tags may be adjusted. Adjusting the display size can comprise reducing the display size from a first zoom level (e.g., for the planar panorama image 462 of FIG. 4C) to a second zoom level (e.g., for the planar panorama image 432 of FIG. 4B) if the second zoom level comprises a zooming-out from the first zoom level. Further, adjusting the display size can comprise increasing the display size from a first zoom level (e.g., for the planar panorama image 432 of FIG. 4B) to a second zoom level (e.g., for the planar panorama image 462 of FIG. 4C) if the second zoom level comprises a zooming-in from the first zoom level. For example, the display size of the data tags at the respective geo-locations 466 (A-G) in the planar panorama image 462 is larger (e.g., larger font) than the (relative) display size of the data tags at the respective geo-locations 436 in the planar panorama 432 of FIG. 4B.

A system may be devised that provides for clustering and re-clustering of point-of-interest (POI) data tags in a planar panorama image. POI data tags may comprise information that allows a viewer of the planar panorama image to distinguish or identify a particular POI in the image, for example, where the POI data tag is located relative to a geo-location of the POI in the image. When a zoom level of the image may result in overlapping POI data tags, and/or obscuring of data, the data tags can be (re)clustered at a common cluster geo-location, which represents more than one geo-location. Further, when the image is zoomed in, the data tags may be re-clustered, and/or separated according to their respective geo-locations in the image, for example.

Figure 6:
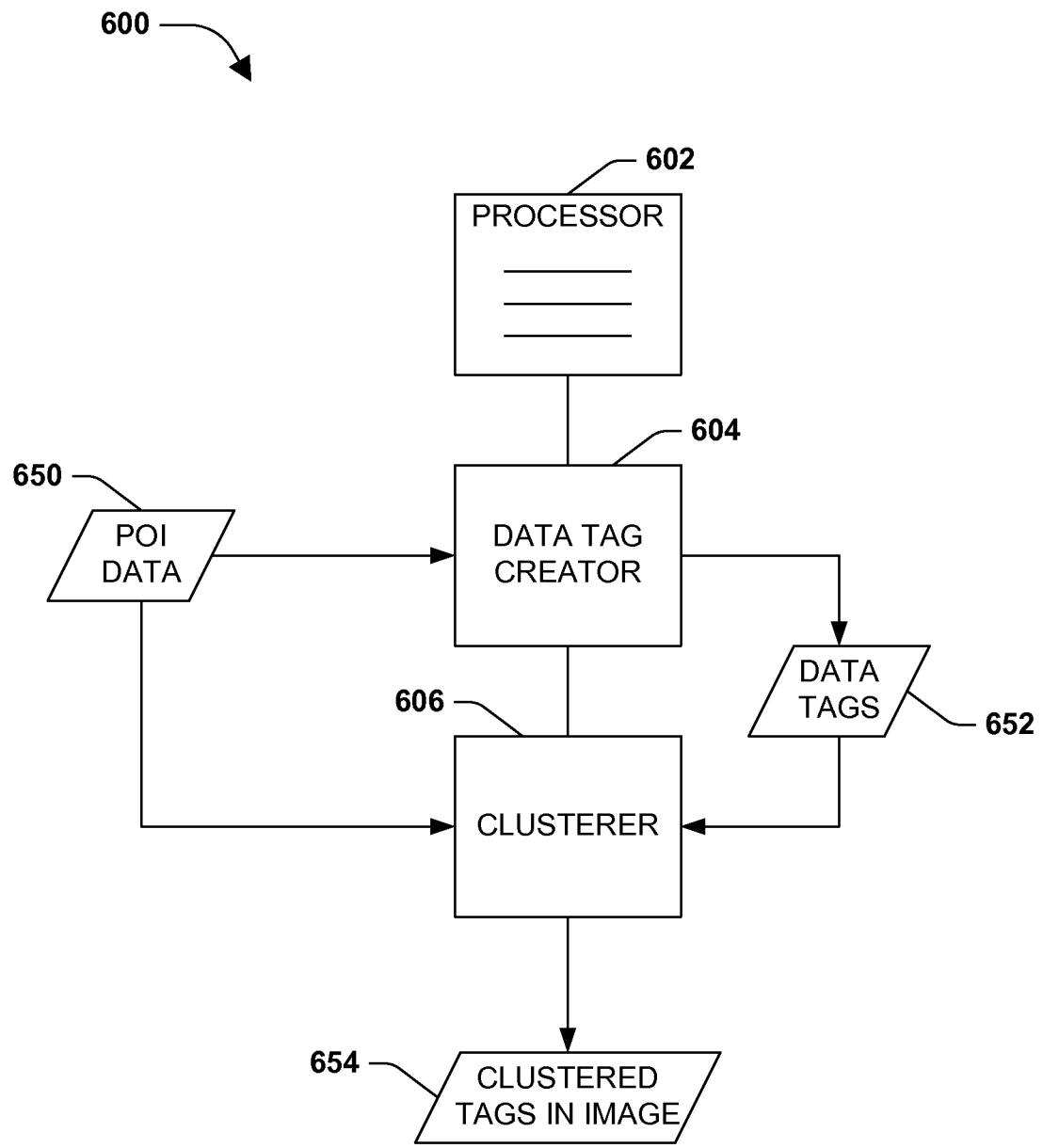
FIG. 6 is a component diagram illustrating an exemplary system for positioning point-of-interest data in a planar panorama image.

FIG. 6 is a component diagram illustrating an exemplary system 600 for positioning point-of-interest (POI) data in a planar panorama image. In the exemplary system 600, a computer-based processor 602, configured to process data for the system 600, is operably coupled with a data tag creation component 604. The data tag creation component 604 is configured to create a first data tag 652, comprising at least a portion of received first POI data 650, and create a second data tag 652, comprising at least a portion of received second POI data 650.

In one embodiment, at least one of the first POI data and the second POI data can comprise, among other things, an entity name (e.g., business, building, location, etc.) associated with a geo-location (e.g., an address, longitude, latitude, GPS coordinates, grid/map coordinates, etc.). Further, the POI data may comprise entity metadata (e.g., descriptive information, contact information, etc.) for an entity associated with a geo-location. Additionally, the POI data may comprise update entity metadata (e.g., online reviews, check-ins, likes, ratings, status, event notices, schedules, advertisements, etc.) for an entity associated with a geo-location, and/or update location metadata (e.g., status updates, check-ins, etc.) for a geo-location. It may be appreciated that some or all of the first POI data and/or the second POI data may be received from an online network (e.g., the Internet).

In one embodiment, at least one of the first data tag and the second data tag can comprise, among other things, text comprising at least a portion of received POI data 650 associated with a data tag; an icon that may be representative of at least a portion of the received POI data 650 associated with a data tag; and/or an image that may be representative of at least a portion of the received POI data 650 associated with a data tag. As an illustrative example, in FIG. 5, the received POI data may comprise an entity name, where the data tag comprises text, such as Silvio's 508 and/or Tim's 506. Further, the received POI data may comprise update location metadata, such as a real-estate listing 516, comprising text. Additionally, the received POI data may comprise entity metadata, such as a bus schedule for a bus-stop 510, as an icon and text. Further, the received POI data may comprise update entity metadata, such as a text-based check-in 518 at Tim's 506, a text-based rating 514 at Val's, and/or an image uploaded 512 at Red's.

Returning to FIG. 6, the exemplary system 600 comprises a clustering component 606, which is operably coupled with the data tag creation component 604. The clustering component 606 is configured to cluster the first data tag and second data tag 652 at a cluster geo-location in the planar panorama image 654, where the cluster geo-location is based at least upon a first geo-location, comprised in the first POI data 650, and a second geo-location, comprised in the second POI data 650. That is, for example, the clustered tags for the image 654 may be rendered at a same location in the planar panorama image, which is displayed to a viewer of the image.

Figure 7:
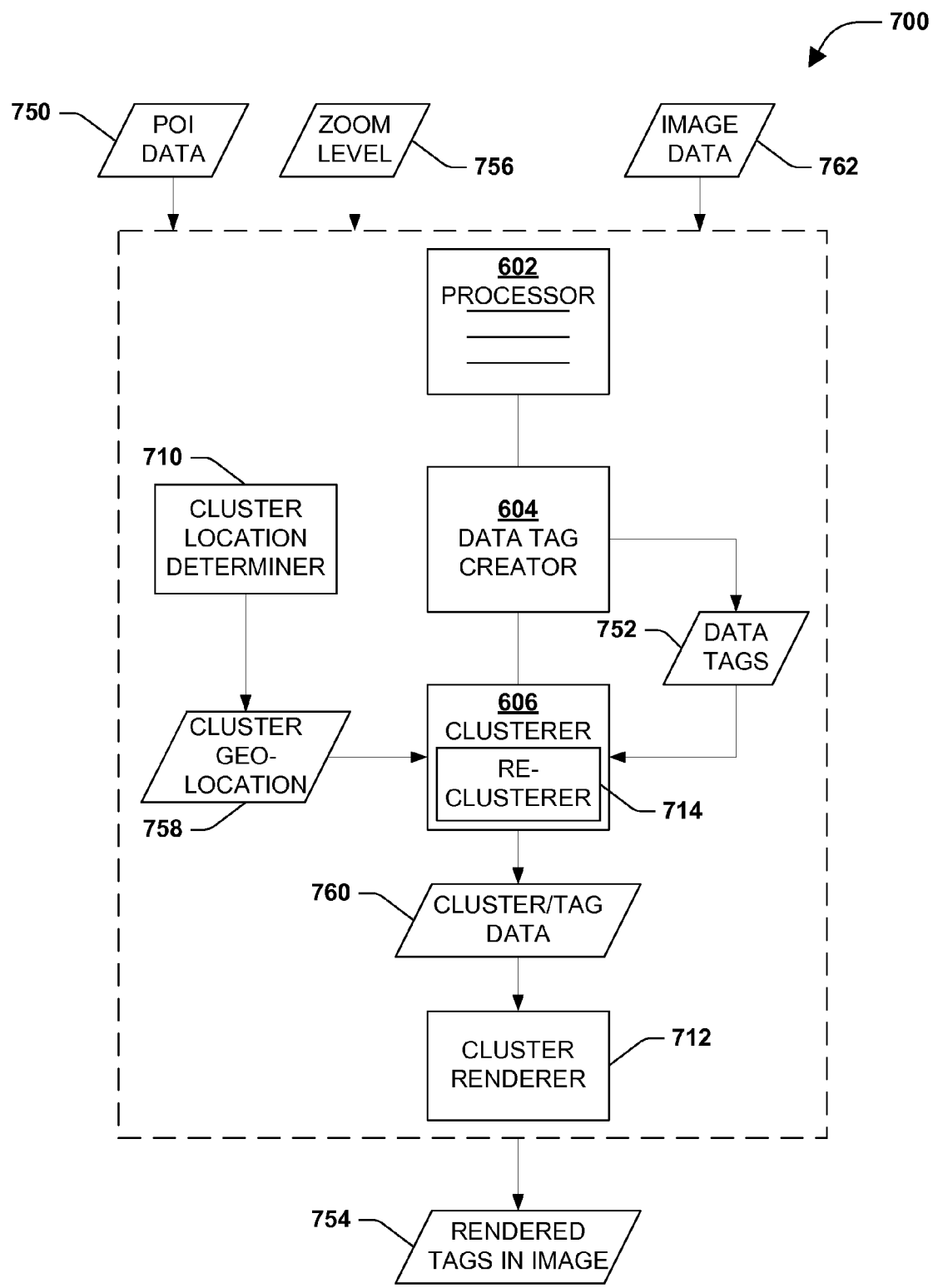
FIG. 7 is a component diagram illustrating an example embodiment where one or more systems described herein may be implemented.

FIG. 7 is a component diagram illustrating an example embodiment 700 where one or more systems described herein may be implemented. In this example 700, an extension of FIG. 6 is provided and thus description of elements, components, etc. described with respect to FIG. 6 may not be repeated for simplicity. In the example embodiment 700, a cluster location determination component 710 can be configured to identify a cluster geo-location 758. In one embodiment, the cluster location determination component 710 can identify the cluster geo-location 758 by identifying a geo-location that may be disposed between a first geo-location and the second geo-location (e.g., approximately centered between), if the first geo-location and the second geo-location are different geo-locations. In one embodiment, the cluster location determination component 710 can identify the cluster geo-location 758 by identifying a geo-location that may be disposed at the first geo-location and the second geo-location, if the first geo-location and the second geo-location are a same geo-location.

In one embodiment, the clustering component 606 can be configured to cluster 760 a first data tag and a second data tag 752 at the cluster geo-location 758 in the planar panorama image, from received image data 762, based at least upon a received indication of a first zoom level 756. Further, in one embodiment, the clustering component 606 can comprise a re-clustering component 714 that is configured to re-cluster 760 the first data tag and second data tag 752 based at least upon a received indication of a second zoom level 756.

In the example embodiment 700, a cluster rendering component 712 can be configured to render a cluster comprising one or more data tags, for example, corresponding to received POI data 750. The cluster can comprise the one or more data tags 752, which can be rendered in a resulting planar panorama image 754. In one embodiment, the cluster can comprise the one or more data tags in a list form at or co-located with a corresponding cluster geo-location (e.g., 406A of FIG. 4A). In one embodiment, the cluster can comprise the one or more data tags in a non-list form, where the one or more data tags are located at corresponding geo-locations. Further, in this embodiment, one or more data tags can respectively comprise a pointer to corresponding geo-locations in the planar panorama image (e.g., 508, 516, 518 of FIG. 5).

In one embodiment, the cluster rendering, performed by the cluster rendering component 712, can comprise locating one or more data tags outside of the planar panorama image (e.g., 508 of FIG. 5). Further, in one embodiment, the cluster rendering can comprise locating one or more data tags over the planar panorama image (e.g., 512, 518 of FIG. 5).

Figure 8:
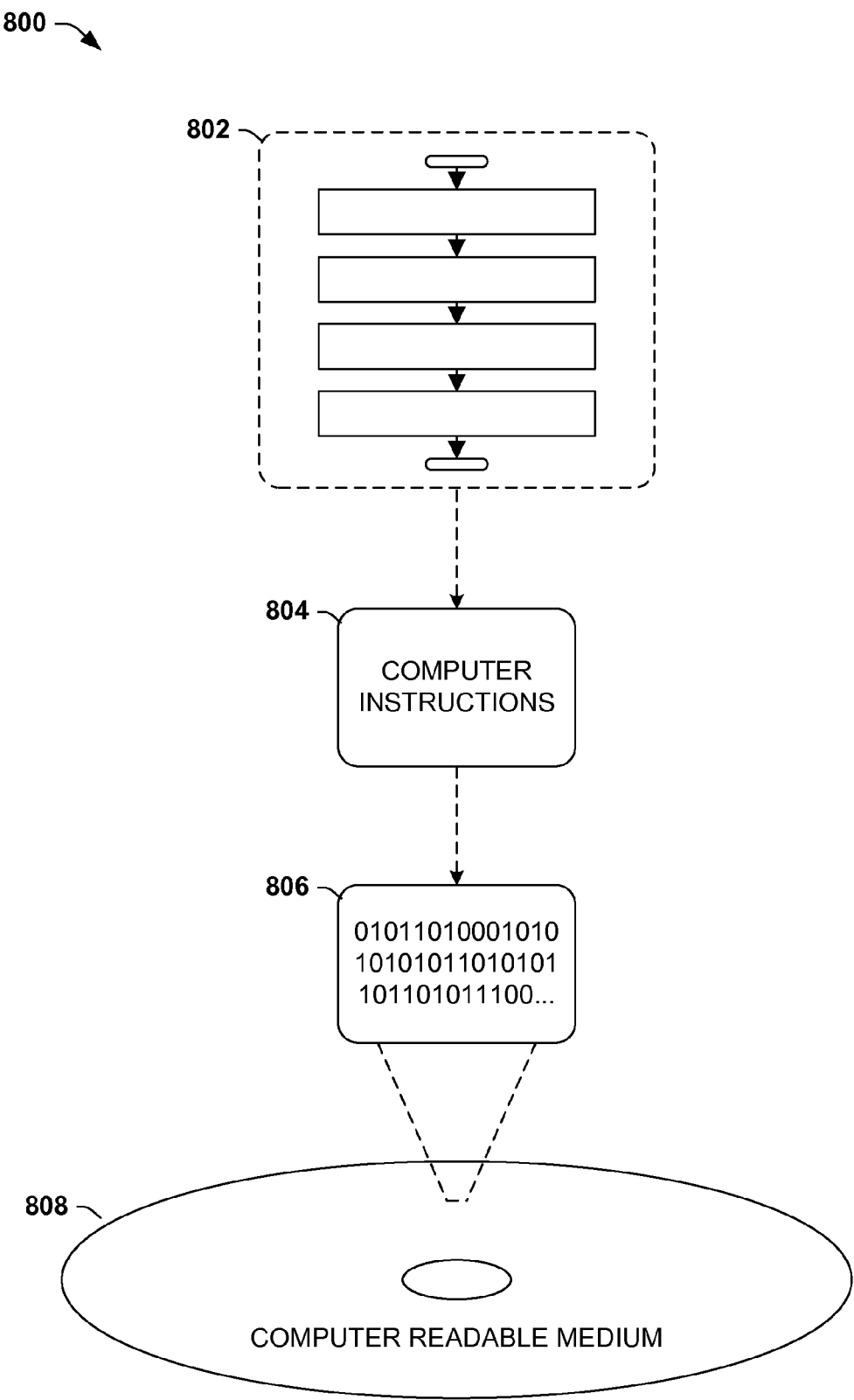
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 100 of FIG. 1, for example. In another such embodiment, the processor-executable instructions 804 may be configured to implement a system, such as at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
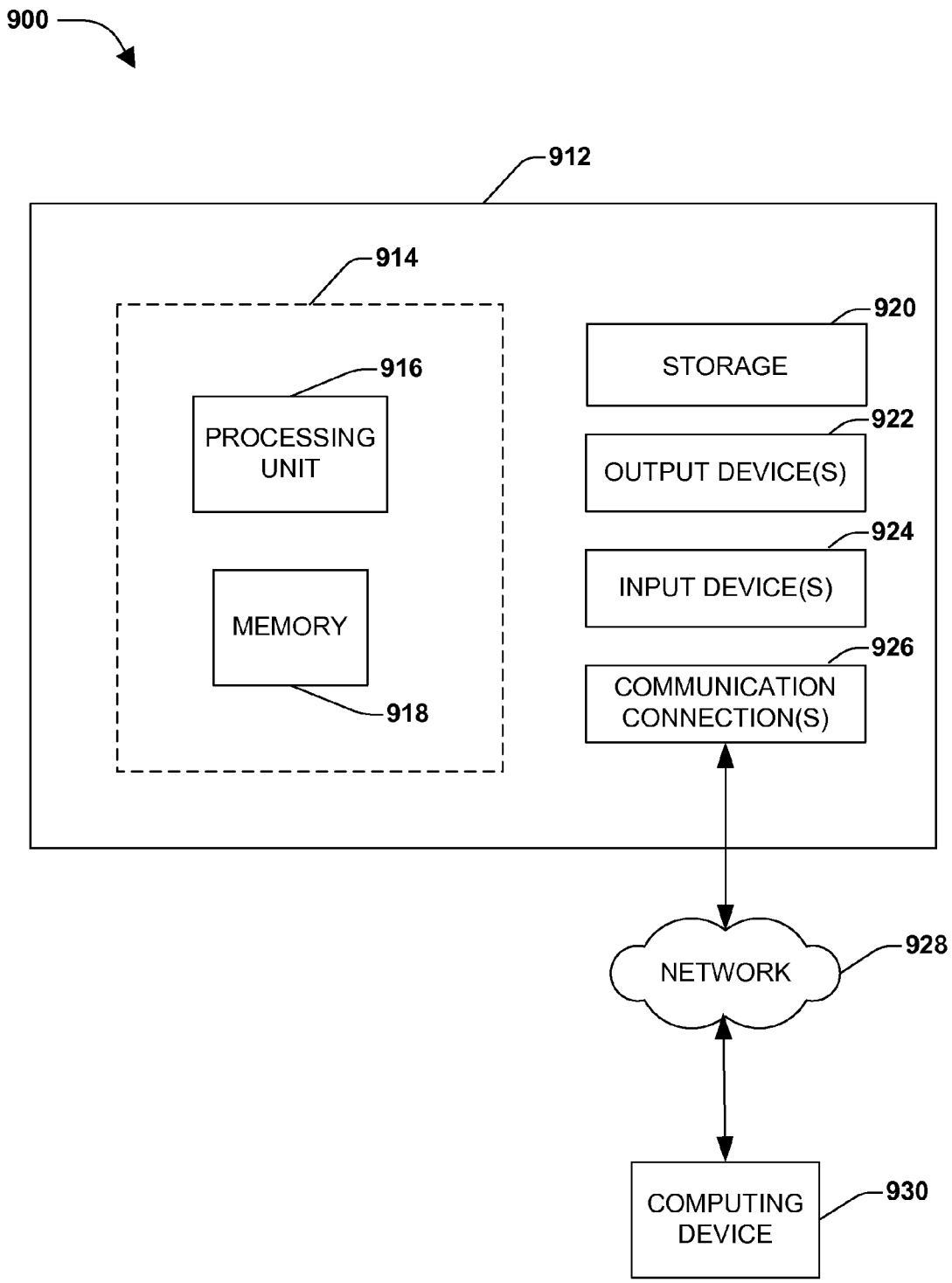
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for positioning point-of-interest (POI) data in a planar panorama image, comprising:
    receiving first POI data, comprising a first geo-location, corresponding to a first POI, and second POI data, comprising a second geo-location, corresponding to a second POI different than the first POI;
    creating a first data tag, comprising at least a portion of the first POI data, corresponding to the first POI, and a second data tag, comprising at least a portion of the second POI data, corresponding to the second POI, at least one of the first data tag or the second data tag not comprising street-side imagery associated with the planar panorama image; and
    clustering the first data tag corresponding to the first POI and the second data tag corresponding to the second POI at a cluster geo-location displayed in the planar panorama image, the cluster geo-location based at least upon the first geo-location and the second geo-location, at least a portion of the clustering performed by a processing unit.

2. The method of claim 1, comprising determining the cluster geo-location comprising one or more of:
    identifying a geo-location disposed between the first geo-location and the second geo-location, if the first geo-location and the second geo-location comprise different geo-locations; or
    identifying a geo-location disposed at the first geo-location and the second geo-location, if the first geo-location and the second geo-location comprise a same geo-location.

3. The method of claim 1, at least one of the first data tag or the second data tag comprising at least one of text, an icon, or an image corresponding to at least one of a business, a store, an exhibit or a gallery.

4. The method of claim 1, comprising receiving an indication of a first zoom level for the planar panorama image, the clustering based at least upon the first zoom level.

5. The method of claim 4, comprising:
    receiving an indication of a second zoom level for the planar panorama image; and
    re-clustering the first data tag and the second data tag based at least upon the second zoom level.

6. The method of claim 5, re-clustering comprising clustering at least a third data tag with the first data tag and the second data tag at the cluster geo-location, the third data tag comprising at least a portion of third POI data, the third POI data comprising a third geo-location, if at least one or more of:
    the second zoom level comprises a zooming-out from the first zoom level; or
    the first geo-location, the second geo-location and the third geo-location are disposed in an area of the planar panorama image comprising a desired size of at least one of the first data tag, the second data tag or the third data tag.

7. The method of claim 5, re-clustering comprising locating the first data tag at the first geo-location and the second data tag at the second geo-location, if at least one or more of:
    the second zoom level comprises a zooming-in from the first zoom level; or
    the first geo-location and the second geo-location are not disposed in an area of the planar panorama image comprising a desired size of at one of the first data tag or the second data tag.

8. The method of claim 1, clustering comprising one or more of:

rendering the first data tag and the second data tag in a list form at the cluster geo-location; or rendering the first data tag and the second data tag in a non-list form, at least one of the first data tag or the second data tag comprising a pointer to the cluster geo-location.

9. The method of claim 8, at least one of rendering in a list form or rendering in a non-list form comprising one or more of:

locating at least one of at least a portion of the first data tag or at least a portion of the second data tag outside of the planar panorama image; or locating at least one of at least a portion of the first data tag or at least a portion of the second data tag over the planar panorama image.

10. The method of claim 1, comprising determining a display size of at least one of the first data tag or the second data tag based at least upon one or more of the first POI data or the second POI data.

11. The method of claim 1, comprising at least one of:

accommodating, via the clustering, at least one of imprecisions or inaccuracies in underlying data; or determining a display size of at least one of the first data tag or the second data tag based at least upon a desired tag window size.

12. The method of claim 1, comprising adjusting a display size of at least one of the first data tag or the second data tag comprising one or more of:

increasing the display size from a first zoom level to a second zoom level if the second zoom level comprises a zooming-in from the first zoom level; or decreasing the display size from the first zoom level to the second zoom level if the second zoom level comprises a zooming-out from the first zoom level.

13. A system for positioning point-of-interest (POI) data in a planar panorama image, comprising:

a data tag creation component configured to create a first data tag, comprising at least a portion of first POI data, corresponding to a first POI, and create a second data tag, comprising at least a portion of second POI data, corresponding to a second POI different than the first POI, at least one of the first data tag or the second data tag not comprising street-side imagery associated with the planar panorama image; and a clustering component configured to cluster the first data tag corresponding to the first POI and the second data tag corresponding to the second POI at a cluster geo-location displayed in the planar panorama image, the cluster geo-location based at least upon a first geo-location, comprised in the first POI data, and a second geo-location, comprised in the second POI data.

14. The system of claim 13, at least one of the first POI data or the second POI data comprising one or more of:

an entity name associated with a geo-location;

entity metadata for an entity associated with a geo-location;

update entity metadata for an entity associated with a geo-location, the update entity metadata received from an online network; or update location metadata for a geo-location, the update location metadata received from an online network.

15. The system of claim 13, at least one of the first data tag or the second data tag comprising one or more of:

text comprising at least a portion of POI data;

an icon representative of at least a portion of POI data; or an image representative of at least a portion of POI data.

16. The system of claim 13, comprising a cluster location determination component configured to identify the cluster geo-location, comprising one or more of:

identifying a geo-location disposed between the first geo-location and the second geo-location, if the first geo-location and the second geo-location comprise different geo-locations; or identifying a geo-location disposed at the first geo-location and the second geo-location, if the first geo-location and the second geo-location comprise a same geo-location.

17. The system of claim 13, the clustering component configured to cluster the first data tag and the second data tag at the cluster geo-location in the planar panorama image based at least upon a received indication of a first zoom level.

18. The system of claim 17, comprising a re-clustering component configured to re-cluster the first data tag and the second data tag based at least upon a received indication of a second zoom level.

19. The system of claim 13, comprising a cluster rendering component configured to render a cluster comprising one or more data tags, the cluster comprising one or more of:

the one or more data tags in a list form co-located with the cluster geo-location; or the one or more data tags in a non-list form respectively comprising pointers to corresponding geo-locations.

20. A computer readable device comprising instructions that when executed perform actions for positioning point-of-interest (POI) data in a planar panorama image, comprising:

receiving first POI data, comprising a first geo-location, corresponding to a first POI, and second POI data, comprising a second geo-location, corresponding to a second POI different than the first POI;

creating a first data tag, comprising at least a portion of the first POI data, corresponding to the first POI, and a second data tag, comprising at least a portion of the second POI data, corresponding to the second POI, at least one of the first data tag or the second data tag not comprising street-side imagery associated with the planar panorama image, at least one of the first data tag or the second data tag comprising at least one of text, an icon, or an image corresponding to at least one of a business, a store, an exhibit or a gallery; and clustering, based at least upon a zoom level for the planar panorama image, the first data tag corresponding to the first POI and the second data tag corresponding to the second POI at a cluster geo-location displayed in the planar panorama image, the cluster geo-location based at least upon the first geo-location and the second geo-location.

* * * * *